T. A. JORDAN.
AUTOMOBILE WHEEL.
APPLICATION FILED DEC. 8, 1919.
1,367,745.
Patented Feb. 8, 1921.
2 SHEETS—SHEET 1.
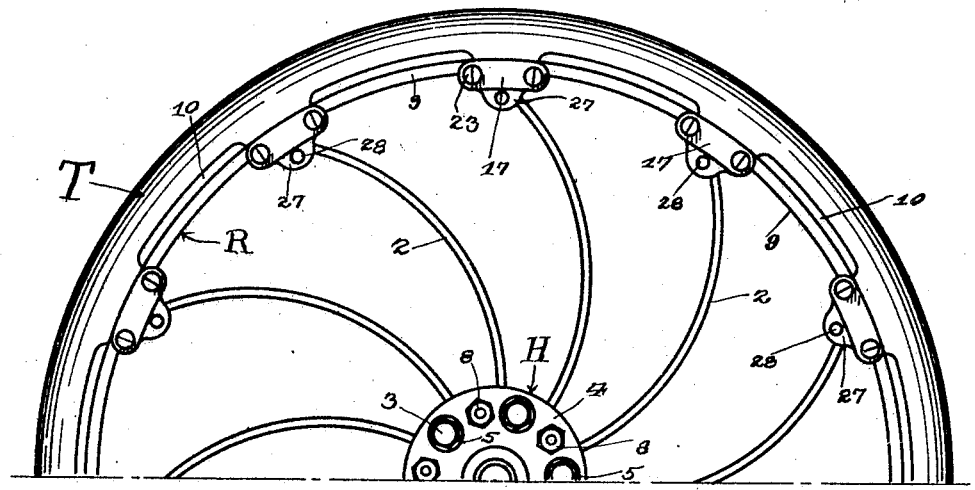
Fig. 1.
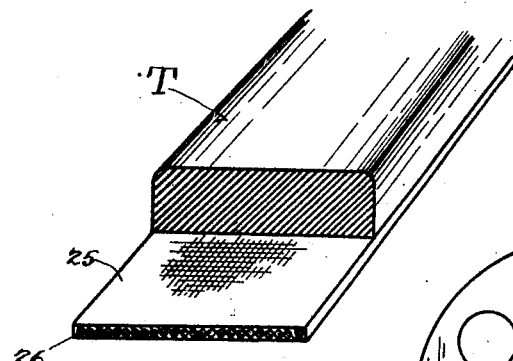
Fig. 2.
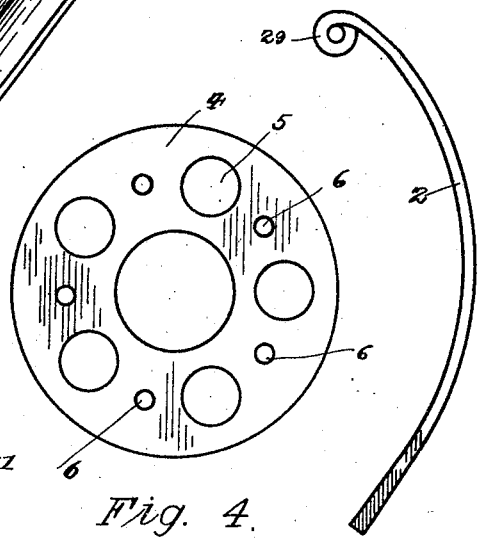
Fig. 4.
Fig. 5.
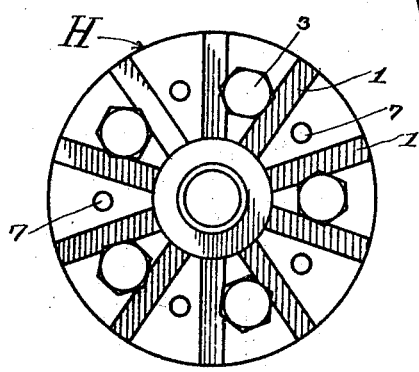
Fig. 3.
Inventor
Thomas A. Jordan,
By Watson E. Coleman
Attorney

T. A. JORDAN.
AUTOMOBILE WHEEL.
APPLICATION FILED DEC. 8, 1919.

1,367,745.

Patented Feb. 8, 1921.
2 SHEETS—SHEET 2.

Inventor
Thomas A. Jordan.

By Watson E. Coleman
Attorney

UNITED STATES PATENT OFFICE.

THOMAS A. JORDAN, OF ARKANSAS CITY, KANSAS.

AUTOMOBILE-WHEEL.

1,367,745.   Specification of Letters Patent.   Patented Feb. 8, 1921.

Application filed December 8, 1919. Serial No. 343,397.

*To all whom it may concern:*

Be it known that I, THOMAS A. JORDAN, a citizen of the United States, residing at Arkansas City, in the county of Cowley and State of Kansas, have invented certain new and useful Improvements in Automobile-Wheels, of which the following is a specification, reference being had to the accompanying drawings.

This invention relates to certain improvements in resilient wheels, and it is an object of the invention to provide a novel and improved structure of this general character embodying a hub with a flexible rim disposed therearound and wherein the rim is operatively connected to the hub through the instrumentality of yieldable elements.

Primarily, it is an object of the invention to provide a novel and improved structure of this general character wherein the use of air is avoided and wherein the structure compensates for the shocks and jars incident to travel to the same advantage as wheel structures including inflatable tires.

An additional object of the invention is to provide a novel and improved structure of this general character including a hub, a rim, and spokes connecting said hub and rim and wherein the hub is so constructed as to permit the removal and replacement of a spoke without the necessity of removing the wheel structure from its axle or without the necessity of raising the vehicle with which the wheel structure is employed.

The invention consists in the details of construction and in the combination and arrangement of the several parts of my improved resilient wheel whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in side elevation of a wheel structure constructed in accordance with an embodiment of my invention.

Fig. 2 is a fragmentary view in perspective of the tire herein disclosed.

Fig. 3 is an enlarged fragmentary view in side elevation of the hub as herein embodied with the side or holding plate removed.

Fig. 4 is a view in side elevation of the side or holding plate detached.

Fig. 5 is a view in side elevation of one of the spokes as herein employed.

Figure 6:
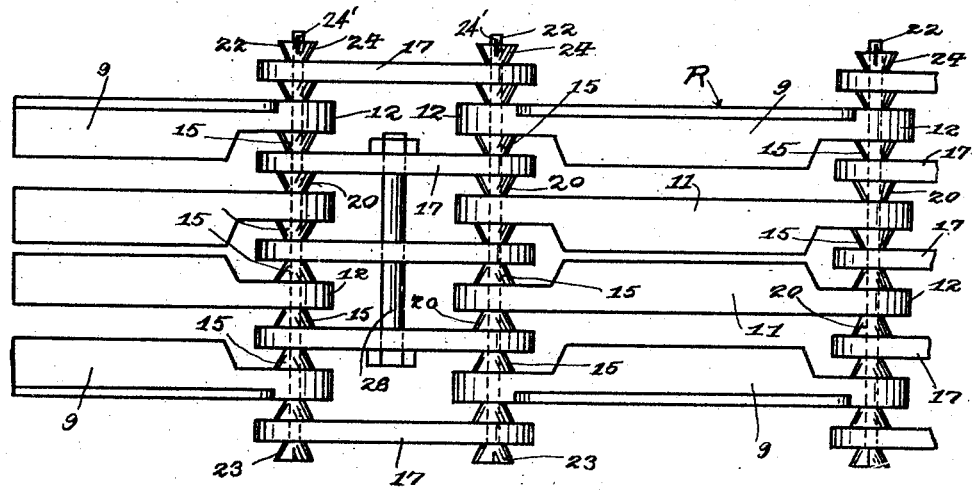
Fig. 6 is a fragmentary view in top plan of the flexible rim as herein disclosed with the coacting tire omitted.
Figure 7:
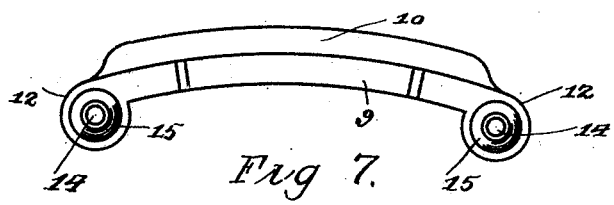
Fig. 7 is an elevational view of one of the side members comprised in the flexible rim.
Figure 9:
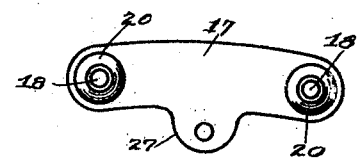
Fig. 9 is a view in elevation of one of the intermediate connecting links and with which the outer end portion of a spoke is adapted to be operatively engaged.
Figure 8:
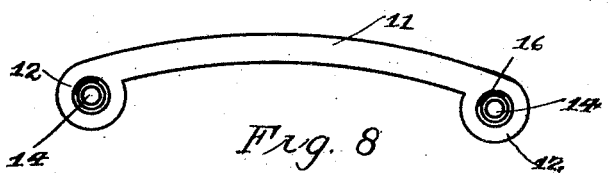
Fig. 8 is a view in side elevation of one of the intermediate members comprised in the flexible rim.
Figure 10:
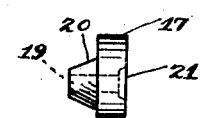
Fig. 10 is a view in elevation of one of the connecting links comprised in the flexible rim.
Figure 11:
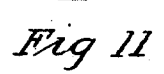
Fig. 11 is a view in end elevation of the link as illustrated in Fig. 10.
Figure 12:
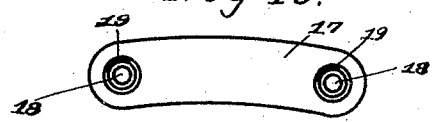
Fig. 12 is a view in side elevation of a second form of connecting link comprised in the flexible rim.

As disclosed in the accompanying drawings, H denotes the hub of my improved wheel structure and is provided in its outer face with a plurality of radially disposed grooves or channels 1 equidistantly spaced in a direction crcumferentially of the hub and in each of which is adapted to be seated an end portion of an elongated curved spoke 2 of resilient material. Engaged with the outer face of the hub H between alternate pairs of the grooves or channels 1 are the clamping screws 3, the heads of which are of sufficient diameter to partially overlie the adjacent grooves or channels 1 whereby the end portions of the spokes inserted within said grooves or channels are held against displacement.

An annular plate 4 is adapted to overlie the outer or grooved face of the hub H and is provided with circumferentially spaced openings 5 each of a diameter in excess of the diameter of the head of a screw 3 and in which said head is received when the plate 4 is in applied position. Between adjacent openings 5, the plate 4 is provided with the smaller openings 6 adapted to register with the openings 7 in the outer or grooved face of the hub H and coacting with said registering openings 6 and 7 in a conventional manner are the holding bolts 8 or the like.

By having the hub constructed as just described, when it is desired to remove and replace a spoke 2, it is only necessary to remove the plate 4 and to disengage from the hub H the screw 3 coacting with the spoke 2 to be removed and vice versa. In view of this, a spoke 2 can be removed or replaced without the necessity of removing the wheel structure from the axle on which it is mounted and without the necessity of jacking up or otherwise lifting the vehicle with which the wheel structure is employed. It will be particularly noted that when the plate 4 is removed, a spoke 2 may be withdrawn without danger of all the spokes becoming disengaged.

R denotes a flexible or articulated rim disposed around the hub H and normally substantially concentric thereto. The rim R comprises a plurality of circumferentially arranged series of members with each pair of adjacent series connected by a series of links. Each series of members comprises side members 9 having their outer longitudinal margins defined by outstanding flanges 10. Each series also includes, as herein disclosed, a pair of intermediate arcuate members 11, each of a length coextensive in length with each of the side members 9. The intermediate or central portion of each of the members 9 and 11 throughout the major length thereof is relatively broad while the extremities of each of said members constitute extensions 12 substantially circular in side elevation and provided with openings 14 at the axial centers thereof.

The extensions 12 at each side of the longitudinal center of the rim R are provided with the inwardly directed tubular bosses 15 defining the openings 14 of said extensions and each of which bosses is in the form of a truncated cone. The opposite or outer side face of each of the extensions 12 has the adjacent end portion of its opening 14 gradually enlarged to provide a socket 16.

Arranged at opposite sides of each of the members 9 and 11 for connecting adjacent series of said members are the arcuate links 17 herein disclosed as five in number. Each of the links 17 has the openings 18 disposed through the opposite ends thereof. The openings 18 of the central link 17 have their opposite end portions enlarged to provide the sockets 19 to receive the inwardly directed bosses 15 of the intermediate members 11. The openings 18 of each of the remaining links 17 are defined by the inwardly directed bosses 20 adapted to engage within the sockets 16 of the adjacent members 9 and 11. These remaining links 17 also have the outer portions of each of their openings 18 enlarged to provide a socket 21. The sockets 21 of the links 17 between the outer pairs of members 9 and 11 receive the inwardly directed bosses 15 carried by the members 9.

Directed through the openings 14 and 18 of the assembled members 9 and 11 and the links 17 are the pintle members or shanks 22 and one end portion of each of said shanks is provided with a tapered head 23 adapted to extend within a socket 19 of an outer link 17 and operatively engaged with the opposite end portions of the shanks 22 are the tapered members 24 which extend within the sockets 19 of the adjacent link 17. This interfitting of the links 17 and the members 9 and 11 results in the pintle members or shanks being relieved of strain or stress when the rim is assembled and in use as the interfitting of the bosses 15 and 20 with their coacting sockets 16 and 21, respectively, assures a direct or positive pivotal connection between said members 9 and 11 and the links 17. The members 24 are held in applied position by cotter pins 24' or otherwise as may best meet the requirements of practice.

Disposed circumferentially around the assembled rim is a base strip 25 of flexible material and which strip has close contact with the members 9 and 11. The strip 25 is flexible and preferably of canvas or kindred textile material reinforced by the cords or strands 26.

Adhesively or otherwise secured to the outer face of the strip 25 is the tire T preferably of rubber. The tire T can be readily and conveniently applied in working position and when the same becomes unduly worn or otherwise unfit for use, the same can be readily and conveniently pulled from the strip 25 and replaced by a new tire.

The intermediate links 17, with the exception of the central link, are provided with the inwardly directed ears 27 which afford mountings for a rod 28 disposed transversely and with which is operatively engaged the outer end portion of a spoke 2, said end portion of the spoke being provided with an eye 29 through which the rod 28 is freely directed.

From the foregoing description it is thought to be obvious that a resilient wheel constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A wheel structure comprising a rim, a hub provided with grooves in a face thereof, spokes operatively connected with the rim and having their inner end portions seating within the grooves of the hub, a plurality of holding means for the spokes carried by the hub, each of said means being independent of the remainder, and means common to all of the spokes for holding the same in operative engagement with the hub.

2. A wheel structure comprising a rim, a hub provided with grooves in a face thereof, spokes operatively connected with the rim and having their inner end portions seating within the grooves of the hub, headed members engaged with the hub and coacting with alternate pairs of adjacent spokes to hold the same within the grooves of the hub, an annular plate adapted to overlie the grooved face of the hub, and means for holding the plate in applied position.

3. A wheel structure comprising a rim, a hub provided with grooves in a face thereof, spokes operatively connected with the rim and having their inner end portions seating within the grooves of the hub, headed members engaged with the hub and coacting with alternate pairs of adjacent spokes to hold the same within the grooves of the hub, an annular plate adapted to overlie the grooved face of the hub, and means for holding the plate in applied position, said plate being provided with openings to accommodate the headed members.

4. A wheel structure comprising a hub, an articulated rim, said rim comprising a plurality of circumferentially spaced series of members, links connecting adjacent series of said members, resilient spokes connecting the rim and hub, and a tire disposed circumferentially around the rim, the adjacent ends of the members and links being provided with interfitting bosses and sockets.

5. A wheel structure comprising a hub, an articulated rim, said rim comprising a plurality of circumferentially spaced series of members, links connecting adjacent series of said members, resilient spokes connecting the rim and hub, a tire disposed circumferentially around the rim, the adjacent ends of the members and links being provided with interfitting bosses and sockets, and pivot members disposed through said members and links.

6. A wheel structure comprising a hub, an articulated rim, said rim comprising a plurality of circumferentially spaced series of members, links connecting adjacent series of said members, resilient spokes connecting the rim and hub, and a tire disposed circumferentially around the rim, the adjacent ends of the members and links being provided with interfitting bosses and sockets, said interfitting bosses and sockets being tapered.

7. A wheel structure comprising a hub, an articulated rim, said rim comprising a plurality of circumferentially spaced series of members, links connecting adjacent series of said members, resilient spokes connecting the rim and hub, and a tire disposed circumferentially around the rim, the adjacent ends of the members and links being provided with interfitting bosses and sockets, said bosses being inwardly directed toward the transverse center of the rim.

8. A wheel structure comprising a hub, an articulated rim, said rim comprising a plurality of circumferentially spaced series of members, links connecting adjacent series of said members, resilient spokes connecting the rim and hub, and a tire disposed circumferentially around the rim, the adjacent ends of the members and links being provided with interfitting bosses and sockets, a link being arranged at each side of a member.

In testimony whereof I hereunto affix my signature.

THOMAS A. JORDAN.